UNITED STATES PATENT OFFICE.

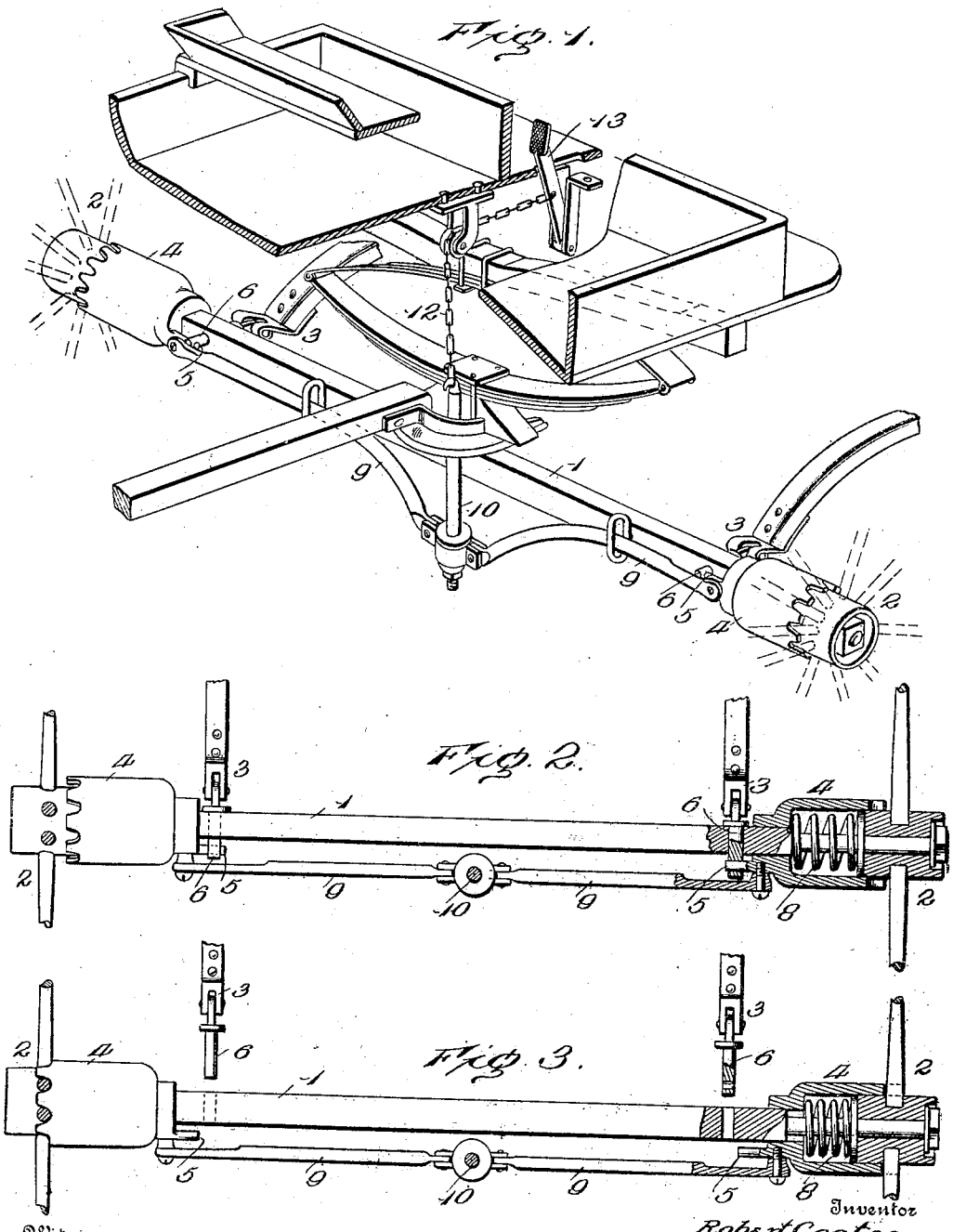

ROBERT COATES, OF WASHINGTON, DISTRICT OF COLUMBIA.

HORSE-DETACHER.

No. 884,795.

Specification of Letters Patent.

Patented April 14, 1908.

Application filed May 21, 1907. Serial No. 374,866.

*To all whom it may concern:*

Be it known that I, ROBERT COATES, of Washington, in the District of Columbia, have invented certain new and useful Improvements in Horse-Detachers; and I do hereby declare the following to be a full, clear, and exact description of the invention, such as will enable others skilled in the art to which it appertains to make and use the same.

The object of this invention is to provide improved, simple and highly efficient means for insuring the release of the tongue or thills from a vehicle and applying braking means to the wheels in case of emergency.

The invention will be hereinafter fully set forth and particularly pointed out in the claims.

In the accompanying drawing, Figure 1 is a view of the front axle of a vehicle with my improvements. Fig. 2 is an enlarged view of the brake, portions being broken away, the parts being in their normal positions. Fig. 3 is a similar view showing the parts in their abnormal positions.

Referring to the drawings, 1 designates the front axle; 2 the hubs; and 3 the thills.

4, 4, are brakes, slidably mounted on axle 1, and designed to normally envelop the inner ends of the hubs 2. Each brake is shown in the form of a sleeve notched at its outer end so as to engage with the wheel spokes at the inner ends thereof when such sleeves are forced outwardly against the wheels. From the inner ends of the brake sleeves project studs 5 which normally fit in openings in bolts 6 pivotally secured to the thill irons and extended through openings in the axle. In this way the thills are detachably attached. The studs 5 are normally held in locking engagement with the thill bolts and the brakes out of engagement with the wheel spokes by springs 8 preferably located within said sleeves.

9, 9, designate brake controlling rods having their outer ends pivotally secured to the brake sleeves and their inner ends pivotally connected together and to a vertically-disposed rod 10 to which is secured one end of a chain 12, the other end of the latter being attached to a foot lever 13 located within convenient reach of the driver. This lever is preferably extended through the footboard of the vehicle.

Normally the parts are in the position shown in Figs. 1 and 2, the brake sleeves being held out of engagement with the wheel spokes by the springs 8. In consequence the studs are in locked engagement with the thill bolts. Pressure on the foot lever 13 will, through rods 9, effect the outward movement of the brake sleeves and the disengagement of the locking studs 5 from the thill bolts 6. In this way the thills are immediately released from the vehicle and at the same time the brakes are applied to the wheels.

By notching the ends of the sleeves so as to take in the spokes slipping of the wheels, after the brakes are applied, is impossible. By reason of having the sleeves engage the spokes at the hub ends thereof, the rotation of the wheels is quickly stopped and all danger of the spokes being broken avoided. It will also be noted that the bolts carried by the thill irons may be readily secured by being inserted through the openings in the axles and engaged by the studs 5 when pressure on the foot lever is released.

I claim as my invention:

1. The combination with a vehicle, of brake sleeves mounted on the front axle thereof and extending over the hubs of the front carrying wheels, said axle having openings therein, thills, bolts pivotally secured thereto and fitted in said openings, studs projecting from said sleeves for engaging said bolts, springs located within said sleeves for normally holding said studs in engagement with said bolts and also holding the sleeves out of engagement with the wheel spokes, and means connected to said sleeves for moving the latter into engagement with the wheel spokes and disengaging the studs from said bolts.

2. The combination with a vehicle, of two brake-sleeves encompassing the hubs of two of the carrying wheels and formed with notches for taking in the wheel spokes at the inner ends thereof, thills, thill-locking studs carried by said sleeves normally engaging and holding said thills, springs normally holding said sleeves out of engagement with the wheel-spokes and holding said studs in engagement with the thills, two rods connected to said sleeves, a vertically-disposed rod to which the former rods are secured, and an operation lever connected to said vertically-disposed rod.

3. The combination with a vehicle having its front axle formed with openings, of two brake sleeves mounted on said axle and having notches in their free ends for taking in the spokes of the front carrying wheels, springs normally holding said sleeves out of engagement with the wheel spokes, thills having bolts pivotally secured thereto and fitted in said openings, studs carried by said sleeves normally engaging said bolts, actuating rods pivotally connected to said brake sleeves, a vertically disposed rod to which the inner ends of said actuating rods are secured, and a foot lever connected to said vertically disposed rod.

In testimony whereof, I have signed this specification in the presence of two subscribing witnesses.

ROBERT COATES.

Witnesses:
FRANCIS S. MAGUIRE,
JOHN A. MURPHY.